United States Patent
Kim et al.

(10) Patent No.: US 8,994,791 B2
(45) Date of Patent: Mar. 31, 2015

(54) APPARATUS AND METHOD FOR DISPLAYING THREE-DIMENSIONAL IMAGES

(75) Inventors: Sung Kyu Kim, Seoul (KR); Dong Wook Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 634 days.

(21) Appl. No.: 13/019,200

(22) Filed: Feb. 1, 2011

(65) Prior Publication Data
US 2011/0187831 A1    Aug. 4, 2011

(30) Foreign Application Priority Data
Feb. 3, 2010    (KR) .................. 10-2010-0009858

(51) Int. Cl.
*H04N 13/02*    (2006.01)

(52) U.S. Cl.
CPC .................. *H04N 13/02* (2013.01)
USPC ......................................................... 348/46

(58) Field of Classification Search
CPC .................................................. H04N 13/012
USPC .................. 348/46, 48, 51; 349/15; 345/8
See application file for complete search history.

(56) References Cited

U.S. PATENT DOCUMENTS

| | | | | |
|---|---|---|---|---|
| 5,781,165 A | * | 7/1998 | Tabata | 345/8 |
| 7,817,339 B2 | * | 10/2010 | Lee | 359/464 |
| 2006/0203085 A1 | * | 9/2006 | Tomita | 348/51 |
| 2007/0047040 A1 | | 3/2007 | Ha | |
| 2010/0238366 A1 | * | 9/2010 | Chang et al. | 349/15 |

FOREIGN PATENT DOCUMENTS

| | | |
|---|---|---|
| KR | 10-0345591 B1 | 11/2002 |
| KR | 10-2006-0019994 A | 3/2006 |
| KR | 10-0667810 B1 | 1/2007 |

OTHER PUBLICATIONS

Apparent 3-D image perceived from luminance-modulation two 2-D images displayed at different depths, Shiro Suyama, Oct. 23, 2003.*
Apparent 3-D image perceived from luminance-modulated two 2-D images displayed at different depths :Shiro Suyama , Mar. 14, 2001.*
Takada et al., Protruding Apparent 3D Images in Depth-Fused 3D Display, IEEE Transactions on Consumer Electronics, vol. 54, No. 2, pp. 233-239 (May 2008).

* cited by examiner

*Primary Examiner* — Tung Vo
*Assistant Examiner* — Rowina Cattungal
(74) *Attorney, Agent, or Firm* — NSIP Law

(57) ABSTRACT

According to the present disclosure, there is disclosed a method and device for displaying a 3-dimensional image, which may provide an improved depth perception. The method according to present invention comprises: forming parallax images for left eye and right eye, each of the parallax images including a plurality of images corresponding to images at different depths for a same object; controlling a brightness of the images of each of the parallax images for the left eye and the right eye; and displaying the parallax images for the left eye and the right eye.

9 Claims, 5 Drawing Sheets

APPARATUS AND METHOD FOR DISPLAYING THREE-DIMENSIONAL IMAGES

CROSS-REFERENCE TO RELATED APPLICATIONS

The present application claims priority from Korean Patent Application No. 10-2010-9858 filed on Feb. 3, 2010, the entire subject matter of which is incorporated herein by reference.

TECHNICAL FIELD

The present disclosure generally relates to a device and method for displaying images, and more particularly to a device and method for displaying 3-dimensional images.

BACKGROUND

Several methods for displaying a 3-dimensional image in conventional display devices are currently known in the art. One of such methods is a stereoscopic display method, which provides a depth perception of 3-dimensional display from a 2-dimensional screen. The stereoscopic display method uses an image parallax between left and right images to provide the depth perception at the 2-dimensional screen. However, since parallax information may be changed only by a pixel unit according to the resolutions of a camera for obtaining the image and a display device, it is difficult to express minute changes in the parallax information within one pixel. Thus, there is a limitation in reducing the minimum unit of depth variation, which may be expressed through the parallax information.

Another method of 3-dimensional image display is a depth fused 3D (DFD) display method, which shows a plurality of 2-dimensional images overlapped with each other by arranging a plurality of displays back and forth. The DFD display method controls the depth perception of the 3-dimensional image through changing the brightness ratio of, for example, two 2-dimensional images on two respective displays arranged back and forth. This method can express minute changes in the parallax information by utilizing two flat panel display devices to implement a 3-dimensional image. However, the DFD method has some problems in that the presentable depth is limited within the gap between the two display devices and the size of the entire device is too large due to the physical distance between the two display devices.

SUMMARY

The present invention is designed to solve the above-mentioned problems of conventional technologies. The purpose of the present invention is to provide a 3-dimensional image display device and a method of implementing the same, which may improve the resolution of depth of a stereoscopic 3-dimensional image.

According to one aspect of the present invention, a method of displaying a 3-dimensional image comprises forming projections of virtual images of an object at different observation depths onto a display panel; forming a first parallax image for a left eye and a second parallax image for a right eye based on the projections; and displaying the first and second parallax images.

According to another aspect of the present invention, a method of displaying a 3-dimensional image comprises: forming a first parallax image for a left eye and a second parallax image for a right eye, each of the first and second parallax images including a plurality of display images, said plurality of display images corresponding to projections of virtual images of an object at different depths as viewed by the respective eye; controlling a brightness of each of the plurality of display images in each of the first and second parallax images; and displaying the first and second parallax images.

According to yet another aspect of the present invention, the 3-dimensional image display device comprises: an image forming unit configured to form a first parallax image for a left eye and a second parallax image for a right eye, each of the first and second parallax images including a plurality of display images, said plurality of display images corresponding to projections of virtual images of an object at different depths as viewed by the respective eye; an image brightness control unit configured to control a brightness of each of the plurality of display images in each of the first and second parallax images; and an image display unit configured to display the first and second parallax images.

According to one embodiment of the present invention, a 3-dimensional image display device and a method capable of enlarging the resolution of depth of a 3-dimensional image by changing the brightness of images on a display panel for each of left and right parallax images may be provided. In addition, according to one embodiment of the present invention, a 3-dimensional image display device and a method capable of expressing minute parallax information may be provided as the parallax information may be changed without being limited to a pixel unit.

DETAILED DESCRIPTION

Embodiments of the present invention are described below with reference to the accompanying drawings. To simplify the description and not to obscure unnecessarily the invention, well-known features and configurations are not described below. Also, although the below description is related to one embodiment of the present invention, it is to be understood that the present invention is not limited to that.

Figure 1:
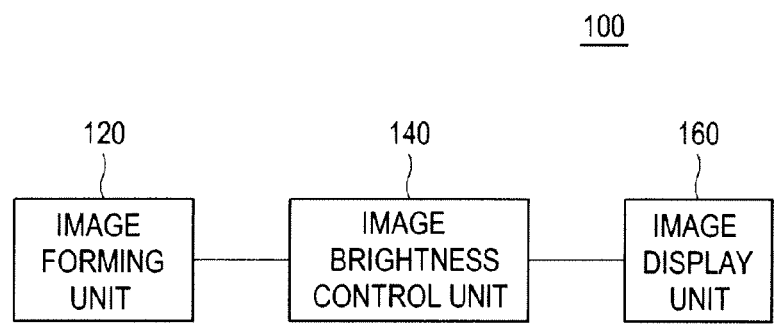
FIG. 1 is a block diagram of a 3-dimensional image display device according to one embodiment of the present invention.

FIG. 1 is a block diagram of a 3-dimensional image display device 100 according to one embodiment of the present invention. As shown in FIG. 1, the 3-dimensional image display device ("display device") 100 comprises an image forming unit 120, an image brightness control unit 140 and an image display unit 160. The image forming unit 120 forms images that are provided to each of the left and right eyes of a viewer according to a predetermined algorithm. A conceptual diagram showing how an image is formed by the image forming unit 120 according to one embodiment of the present invention is shown in FIG. 2.

Figure 2:
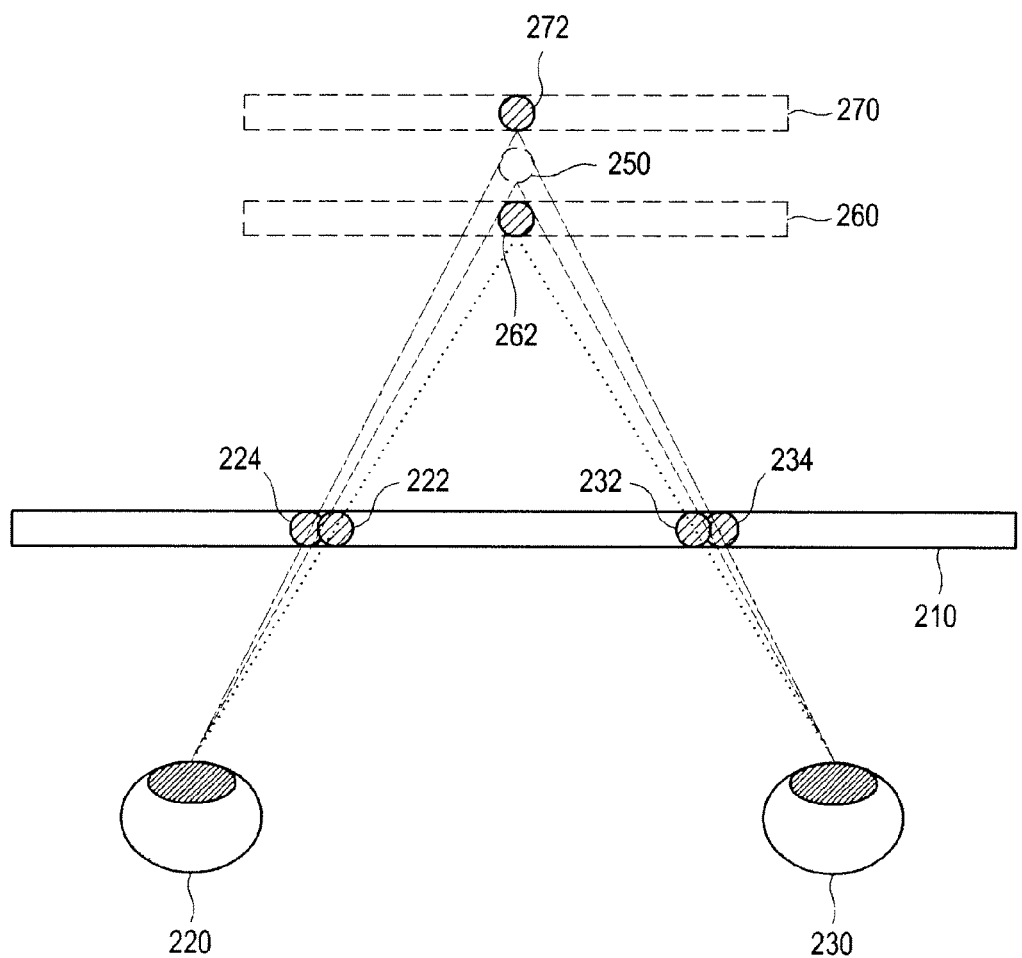
FIG. 2 is a conceptual diagram showing how an image is formed by an image forming unit according to one embodiment of the present invention.

Referring to FIG. 2, the image forming unit 120 forms display images 222, 224, 232 and 234 located on one display panel 210. In the present disclosure, the positions of the display images 222, 224, 232 and 234 are determined by projecting virtual images 262 and 272 on first and second virtual display panels 260 and 270 onto the display panel 210, assuming that the first and second virtual display panels 260 and 270 are positioned separate from each other by a predetermined distance. In one embodiment, the virtual images 262 and 272 on the first and second virtual display panels 260 and 270 are of the same object. In one embodiment, the display images 222, 224, 232 and 234 are provided on the display panel 210 such that the viewer may perceive the display images 222, 224, 232 and 234 as the same size considering the distortion of the rendered space. The display images 222 and 232 correspond to the projections of the virtual image 262 on the first virtual display panel 260. Further, the display images 224 and 234 correspond to the projections of the virtual image 272 on the second virtual display panel 270. The display images 222 and 224 are provided to the left eye 220, while the display images 232 and 234 are provided to the right eye 230. Although the display images 222 and 224 for the left eye 220 are shown to overlap each other and the display images 232 and 234 for the right eye 230 are shown to overlap each other in FIG. 2, it will be readily understood by those skilled in the art that the display images 222, 224, 232 and 234 may or may not overlap each other.

Figure 3A:
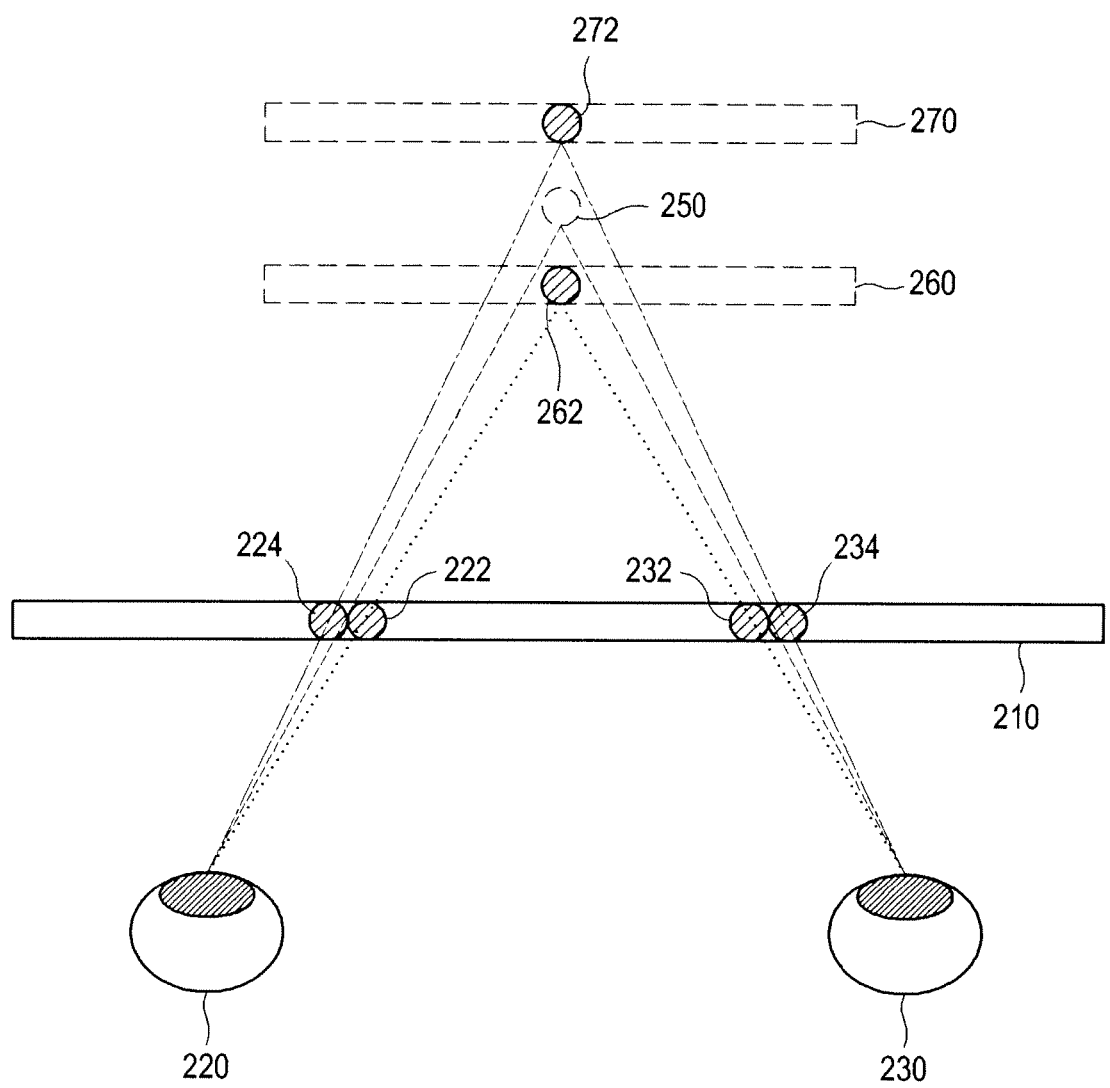
FIGS. 3a-3c are a diagram showing how the brightness of images is controlled by an image brightness control unit according to one embodiment of the present invention.
Figure 3B:
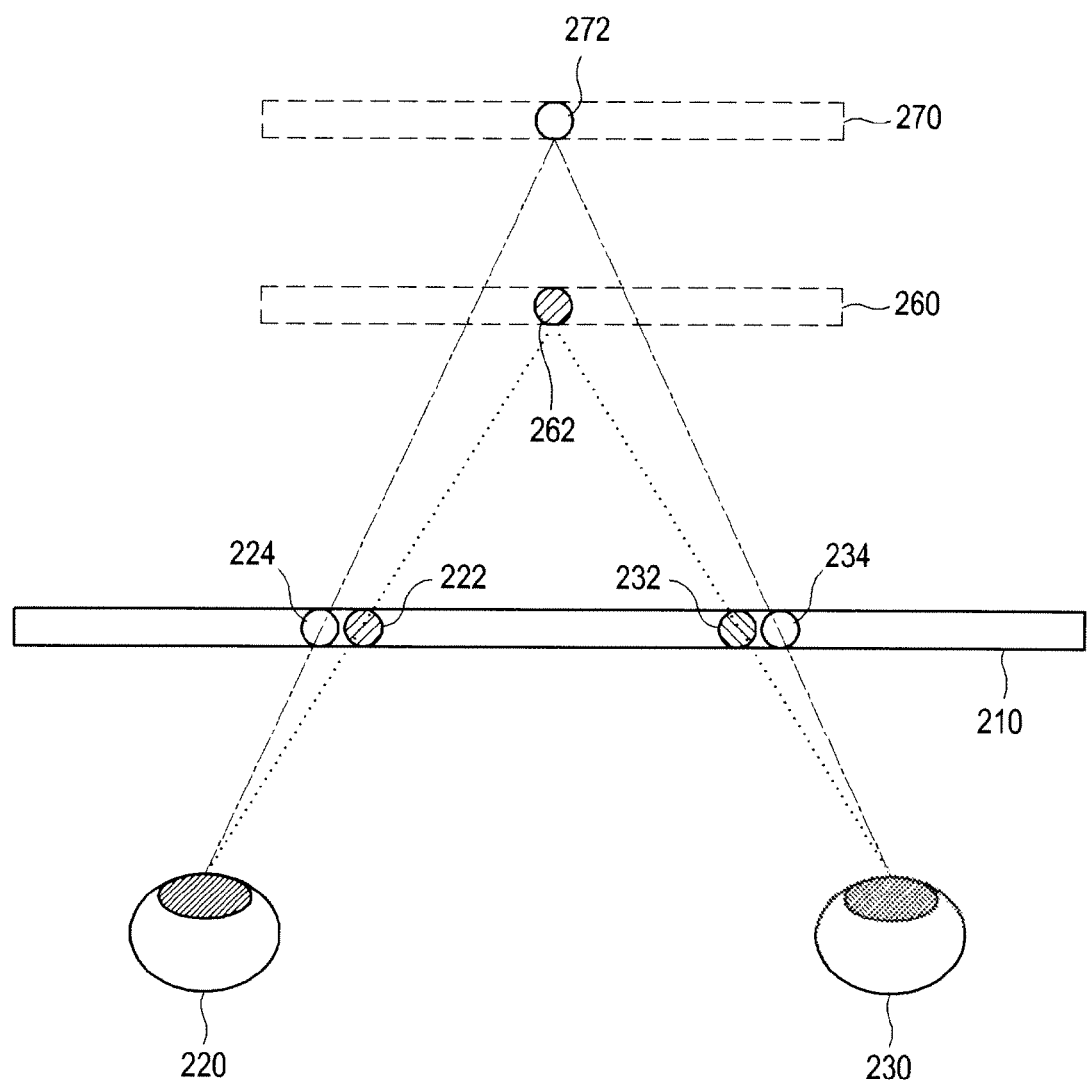
Figure 3C:
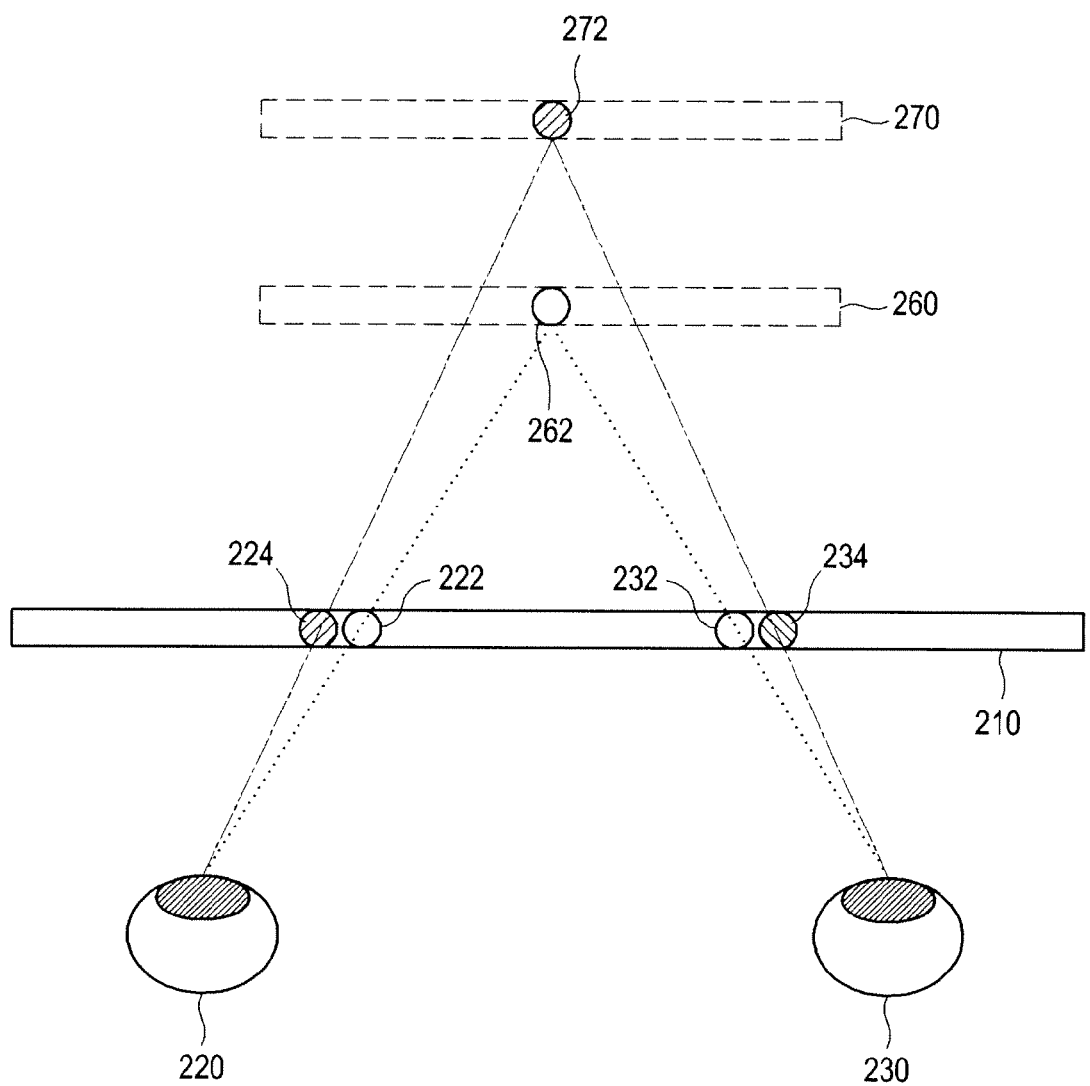

Referring back to FIG. 1, the image brightness control unit 140 controls the brightness of the display images 222, 224, 232 and 234 formed by the image forming unit 120. The brightness of the display images 222, 224, 232 and 234 are controlled by utilizing a method used in the conventional DFD method. FIGS. 3*a*-3*c* are diagrams showing how the brightness of the display images 222, 224, 232 and 234 is controlled by the image brightness control unit 140 according to one embodiment of the present invention. For purposes of description, the display images 222, 224, 232 and 234 are shown as not overlapping with each other. In FIG. 3*a*, the display images 222 and 232 corresponding to the projections of the virtual image 262 on the first virtual display panel 260 and the display images 224 and 234 corresponding to the projections of the virtual image 272 on the second virtual display panel 270 have the same brightness. In this case, the viewer perceives the depth as a 3-dimensional image 250 and is placed at the middle of the two virtual display panels 260 and 270.

In FIG. 3*b*, the display images 222 and 232 corresponding to the projections of the virtual image 262 on the first virtual display panel 260 have a brightness ratio of 100%. However, the display images 224 and 234 corresponding to the projections of the virtual image 272 on the second virtual display panel 270 have a brightness ratio of 0% (i.e., the display images 224 and 234 corresponding to the projections of the virtual image 272 on the second virtual display panel 270 are not displayed). In such a case, the viewer perceives the depth as the 3-dimensional image and is placed at depth of the first virtual display panel 260. In FIG. 3*c*, the display images 222 and 232 corresponding to the projections of the virtual image 262 on the first virtual display panel 260 have a brightness ratio of 0% (i.e., the display images 222 and 232 corresponding to the projections of the virtual image 262 on the second virtual display panel 260 are not displayed). However, the display images 224 and 234 corresponding to the projections of the virtual image 272 on the second virtual display panel 270 have a brightness ratio of 100%. In this case, the viewer perceives the depth as the 3-dimensional image and is placed at depth of the second virtual display panel 270.

As such, the image brightness control unit 140 controls the brightness of the display images 222 and 232 corresponding to the projections of the virtual image 262 on the first virtual display panel 260 to be the same as each other. It also controls the brightness of the display images 224 and 234 corresponding to the projections of the virtual image 272 on the first virtual display panel 270 to be the same as each other. It is to be understood that the depth of the 3-dimensional image 250 perceived by the viewer may be changed when the brightness of the display images 222, 224, 232 and 234 is adjusted by the image brightness control unit 140. In one embodiment, the 3-dimensional image 250 will be perceived to be at the depth closer to the first virtual display panel 260 as the brightness of the display images 222 and 232 corresponding to the projections of the virtual image 262 on the first virtual display panel 260 is brighter than the brightness of the display images 224 and 234 corresponding to the projections of the virtual image 272 on the second virtual display panel 270.

Referring back to FIG. 1, the image display unit 160 displays the display images, the brightness of which has been adjusted. In one embodiment, the image display unit 160 displays the brightness-adjusted images 222 and 224 or 232 and 234 together by using a brightness division method. The brightness division method first halves the brightness of each of the display images 222 and 224 or 232 and 234, and then combines the brightness of each of the display images 222 and 224 or 232 and 234 to display. When the brightness of the two display images 222 and 224 or 232 and 234 is combined to display, the viewer perceives that the two display images 222 and 224 or 232 and 234 are displayed concurrently. In one embodiment, the two display images 222 and 224 or 232 and 234 may be translucent similar to the conventional DFD method.

In another embodiment, the image display unit 160 displays the brightness-adjusted images 222 and 224 or 232 and 234 by using a time division method. The time division method displays the two display images 222 and 224 or 232 and 234 alternately. When the two display images 222 and 224 or 232 and 234 are displayed alternately with a fast refresh rate, the viewer perceives that the two display images 222 and 224 or 232 and 234 are displayed concurrently. Preferably, the refresh rate may be, for example, 120 Hz, which is twice as fast as a normal display device. In one embodiment, the two display images 222 and 224 or 232 and 234 may be translucent similar to the conventional DFD method.

In one embodiment, the distance between the two display images 222 and 224 or 232 and 234 may be the size of one unit pixel of the screen. While the minimum range of variation of parallax information was limited to the pixel unit according to the resolution of the display device in the conventional technology, the present invention may express minute parallax information since the parallax information can be changed within one pixel.

Figure 4:
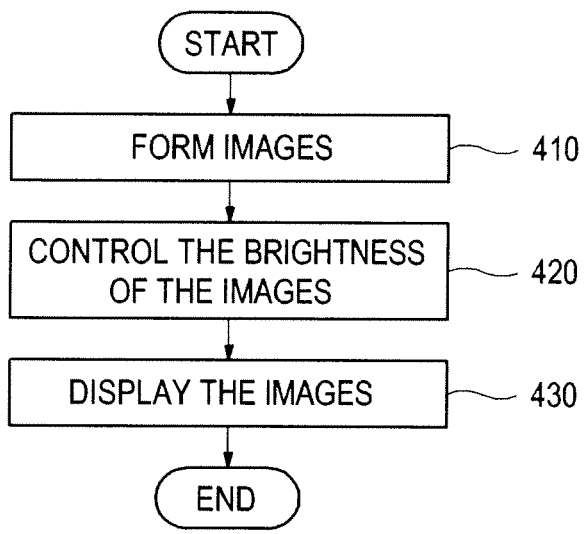
FIG. 4 is a flow diagram of a method for displaying a 3-dimensional image according to one embodiment of the present invention.

FIG. 4 shows a flow diagram of the method for displaying a 3-dimensional image according to one embodiment of the present invention. In step 410, the display images 222, 224, 232 and 234 are formed on the display panel by the image forming unit 120. The display images 222 and 232 correspond to the projections of the virtual image 262 on the first virtual display panel 260. Further, the display images 224 and 234 correspond to the projections of the virtual image 272 on the second virtual display panel 270. In step 420, the brightness of the formed display images is controlled by the image brightness control unit 140. In one embodiment, the depth perception of the 3-dimensional image may be controlled by adjusting the brightness. For example, the 3-dimensional image 250 will be perceived to be at the depth closer to the first virtual display panel 260 as the brightness of the display images 222 and 232 corresponding to the projections of the virtual image 262 on the first virtual display panel 260 is brighter than the brightness of the display images 224 and 234 corresponding to the projections of the virtual image 272 on the second virtual display panel 270. In step 430, the display images are displayed by the display unit 160. In one embodiment, the image display unit 160 displays the brightness-adjusted images 222 and 224 or 232 and 234 together by using the brightness division method. In the brightness division method, the brightness data of the display images 222 and 224 for the left eye, for example, are first halved, and then the brightness data of the images 222 and 224 are combined and outputted when displaying. As such, the viewer perceives that the two display images 222 and 224 are provided concurrently. In another embodiment, the image display unit 160 displays the brightness-adjusted images 222 and 224 or 232 and 234 by using the time division method. In the time division method, the display images 222 and 224 for the left eye, for example, are displayed alternately. As such, the viewer perceives that the two display images 222 and 224 are provided concurrently. It is decided according to a predetermined algorithm whether to use the brightness division method or the time division method. In one embodiment, the algorithm considers the characteristics such as the rate of the display device in determining whether to use the brightness division method or the time division method.

In the above description, each of the parallax images for the left eye 220 and the right eye 230 are shown to be provided through the display panel 210 in order to simplify the description. However, it will be readily understood by those skilled in the art that the conventional stereoscopic or autostereoscopic methods (e.g., polarized glasses, head mounted display (HMD), parallax barrier, lenticular lens, etc.) may be used to provide parallax images for each eye. In addition, the device and method of displaying a 3-dimensional image according to the present invention may be applied to a multiview or super-multiview display. The images shown on the display panel 210 for providing the parallax image to both eyes 220 and 230 of the viewer according to the present invention may vary according to the parallax image providing method used.

Since the present invention utilizes two virtual display panels represented on one display panel rather than two physical display panels, the two virtual display panels may be configured to be infinitely separated from each other. Thus, they may express an infinite depth perception without the limitation on depth expression of conventional DFD methods. Also, while conventional stereo display devices provide a 3-dimensional image using only the parallax of left and right images, the present invention may express the depth variation within one pixel through the change in the brightness rate of each image.

Although the present invention has been described in detail, it should be understood that various changes, substitutions and alterations can be made hereto without departing from the spirit and scope of the invention as defined by the appended claims.

What is claimed is:

1. A method of displaying a 3-dimensional image, comprising:
   forming a first parallax image for a left eye and a second parallax image for a right eye, each of the first and second parallax images including a plurality of display images of an object at different depths;
   controlling a brightness level of each of the display images in each of the first and second parallax images to control a depth of each of the first and second parallax images; and
   displaying the first and second parallax images,
   wherein displaying the first and second parallax images comprises composing a first image for the left eye by combining the display images of the first parallax image and a second image for the right eye by combining the display images of the second parallax image,
   wherein the first and second parallax images are displayed apart from each other by a predetermined distance on a real display panel,
   wherein the displayed first parallax image corresponds to projections of a first virtual image of the object on a first virtual display panel and a second virtual image of the object on a second virtual display panel onto the real display panel,
   wherein the displayed second parallax image corresponds to projections of the first virtual image of the object on the first virtual display panel and the second virtual image of the object on the second virtual display panel onto the real display panel,
   wherein the first and second virtual display panels are positioned at different depths from the real display panel,
   wherein the display images for each of the left and right eyes comprise a first display image corresponding to the projection of the first virtual image of the object at a first depth of the different depths and a second display image corresponding to the projection of the second virtual image of the object at a second depth of the different depths, said second depth being deeper than the first depth, and
   wherein forming the first parallax image for the left eye and the second parallax image for the right eye comprises forming the first and second display images for the left eye such that the second display image is positioned left from the first display image by a predetermined distance and forming the first and second display images for the right eye such that the second display image is positioned right from the first display image by the predetermined distance, or forming the first parallax image for the left eye and the second parallax image for the right eye comprises forming the first and second display images for the left eye such that the second display image is positioned right from the first display image by a predetermined distance and forming the first and second display images for the right eye such that the second display image is positioned left from the first display image by the predetermined distance.

2. The method of claim 1, wherein displaying the first and second parallax images comprises displaying the first and second display images simultaneously or sequentially for each of the left and right eyes.

3. The method of claim 1, wherein controlling the brightness level of each of the display images in each of the first and second parallax images comprises controlling the brightness of the first display image of the first parallax image corresponding to the projection of the first virtual image and the brightness of the first display image of the second parallax image corresponding to the projection of the first virtual image to be the same.

4. A 3-dimensional image display device, comprising:
   an image forming unit configured to form a first parallax image for a left eye and a second parallax image for a right eye, each of the first and second parallax images including a plurality of display images of an object at different depths;
   an image brightness control unit configured to control brightness of each of the display images in each of the first and second parallax images to control a depth of each of the first and second parallax image; and an image display unit configured to display the first and second parallax images, wherein the image display unit is further configured to compose a first image for the left eye by combining the display images of the first parallax image and a second image for the right eye by combining the display images of the second parallax image, wherein the first and second parallax images are displayed apart from each other by a predetermined distance on the image display unit, wherein the displayed first parallax image corresponds to projections of a first virtual image of the object on a first virtual display panel and a second virtual image of the object on a second virtual display panel onto the image display unit, wherein the displayed second parallax image corresponds to projections of the first virtual image of the object on the first virtual display panel and the second virtual image of the object on the second virtual display panel onto the image display unit, wherein the first and second virtual display panels are positioned at different depths from the image display unit, wherein the display images for each of the left and right eyes comprise a first display image corresponding to the projection of the first virtual image of the object at a first depth of the different depths and a second display image corresponding to the projection of the second virtual image of the object at a second depth of the different depths, said second depth being deeper than the first depth, and wherein the image forming unit comprises means for forming the first and second display images for the left eye such that the second display image is positioned left from the first display image by a predetermined distance and forming the first and second display images for the right eye such that the second display image is positioned right from the first display image by the predetermined distance, or the image forming unit comprises means for o in the first and second display images for the left eye such that the second display image is positioned right from the first display image by a predetermined distance and forming the first and second display images for the right eye such that the second display image is positioned left from the first display image by the predetermined distance.

5. The 3-dimensional image display device of claim 4, wherein the image display unit comprises means for displaying the first and second display images simultaneously or sequentially for each of the left and right eyes.

6. A method of displaying a 3-dimensional image, comprising:

forming projections of virtual images of an object at different observation depths onto a real display panel;

forming a first parallax image for a left eye and a second parallax image for a right eye based on the projections, the first parallax image and the second parallax image comprising a plurality of display images of the object at different depths; and displaying the first and second parallax images, wherein displaying the first and second parallax images comprises composing a first image for the left eye by combining the display images of the first parallax image and a second image for the right eye by combining the display images of the second parallax image, wherein the first and second parallax images are displayed apart from each other by a predetermined distance on the real display panel, wherein the displayed first parallax image corresponds to projections of a first virtual image of the object on a first virtual display panel and a second virtual image of the object on a second virtual display panel onto the real display panel, wherein the displayed second parallax image corresponds to projections of the first virtual image of the object on the first virtual display panel and the second virtual image of the object on the second virtual display panel onto the real display panel, and wherein the first and second virtual display panels are positioned at different depths, wherein the display images for each of the left and right eyes comprise a first display image corresponding to the projection of the first virtual image of the object at a first depth of the different depths and a second display image corresponding to the projection of the second virtual image of the object at a second depth of the different depths, said second depth being deeper than the first depth, and wherein forming the first parallax image for the left eye and the second parallax image for the right eye comprises forming the first and second display images for the left eye such that the second display image is positioned left from the first display image by a predetermined distance and forming the first and second display images for the left eye such that the second display image is positioned right from the first display image by the predetermined distance, or forming the first parallax image for the left eye and the second parallax image for the right eye comprises forming the first and second display images for the left eye such that the second display image is positioned right from the first display image by a predetermined distance and forming the first and second display images for the right eye such that the second display image is positioned left from the first display image by the predetermined distance.

7. The method of claim 6, wherein said display panel is located at a distinct depth from the different observation depths.

8. The method of claim 6, wherein forming a first parallax image for the left eye and a second parallax image for the right eye comprises forming a plurality of display images corresponding to the projections for each of the left and right eyes.

9. The method of claim 8, further comprising controlling a brightness level of each of the display images for each of the left and right eyes.

* * * * *